United States Patent
Zhang et al.

(10) Patent No.: US 10,225,820 B2
(45) Date of Patent: Mar. 5, 2019

(54) METHOD, APPARATUS AND SYSTEM FOR CONFIGURING MULTIMEDIA BROADCAST MULTICAST SERVICE (MBMS) CONTROL INFORMATION

(75) Inventors: Dajun Zhang, Beijing (CN); Jing Liang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 699 days.

(21) Appl. No.: 13/382,928

(22) PCT Filed: Aug. 11, 2010

(86) PCT No.: PCT/CN2010/075906
§ 371 (c)(1),
(2), (4) Date: Jan. 8, 2012

(87) PCT Pub. No.: WO2011/018037
PCT Pub. Date: Feb. 17, 2011

(65) Prior Publication Data
US 2012/0113886 A1    May 10, 2012

(30) Foreign Application Priority Data
Aug. 11, 2009    (CN) .......................... 2009 1 0090799

(51) Int. Cl.
*H04W 4/06*    (2009.01)
*H04W 72/00*   (2009.01)
*H04W 48/08*   (2009.01)

(52) U.S. Cl.
CPC ............ *H04W 72/005* (2013.01); *H04W 4/06* (2013.01); *H04W 48/08* (2013.01)

(58) Field of Classification Search
CPC ....... H04W 4/06; H04W 4/08; H04W 72/005; H04L 12/18; H04L 12/1845; H04L 12/189
(Continued)

(56) References Cited

U.S. PATENT DOCUMENTS

2009/0323574 A1* 12/2009 Koskinen et al. ............ 370/312
2010/0128646 A1*  5/2010 Gao .............................. 370/312
(Continued)

FOREIGN PATENT DOCUMENTS

CN          1735231 A     2/2006
CN         101064622 A   10/2007
(Continued)

OTHER PUBLICATIONS

International Search Report issued International Application No. PCT/CN2010/075906, dated Nov. 4, 2010.
(Continued)

*Primary Examiner* — Christopher P Grey
(74) *Attorney, Agent, or Firm* — Ladas & Parry, LLP

(57) ABSTRACT

The present invention discloses a method, an apparatus and a system for configuring Multimedia Broadcast Multicast Service (MBMS) control information, and the method includes: a network side apparatus broadcasts Multicast Control Channel (MCCH) configuration information to the terminal by Broadcast Control Channel (BCCH), and the MCCH configuration information is received by the terminal; the network side apparatus sends Multicast Broadcast Single Frequency Network (MBSFN) region configuration information to the terminal by the MCCH channel; the MBSFN region configuration information is received by the terminal according to the MCCH configuration information; the network side apparatus sends MBMS service data to the terminal by Multicast Traffic Channel (MTCH); the MBMS
(Continued)

service data is received by the terminal according to the MBSFN region configuration information. In the present invention, the network side apparatus broadcasts MCCH configuration information to the terminal by the BCCH channel, and sends MBSFN region configuration information to the terminal by the MCCH channel respectively, thereby the information required to be transmitted in the BCCH channel and MCCH channel is configured in division, the capability requirements of the different air interfaces are satisfied, and the signaling overhead is saved.

16 Claims, 8 Drawing Sheets

(58) Field of Classification Search
USPC .................. 370/312, 329, 390, 432; 725/81
See application file for complete search history.

(56) References Cited

U.S. PATENT DOCUMENTS

| | | | |
|---|---|---|---|
| 2010/0165901 A1* | 7/2010 | Kim | ........................... 370/312 |
| 2012/0093060 A1* | 4/2012 | Huschke | ............... H04W 48/12 |
| | | | 370/312 |

FOREIGN PATENT DOCUMENTS

| | | |
|---|---|---|
| CN | 101262626 A | 9/2008 |
| EP | 2068492 A1 | 6/2009 |
| EP | 2234420 A1 | 9/2010 |
| KR | 20080111392 A1 | 12/2008 |
| WO | 2008/054113 A2 | 5/2008 |
| WO | 2009078152 A1 | 6/2009 |

OTHER PUBLICATIONS

European Patent Office, Extended European Search Report, European Patent Application No. 10807982.3, dated May 11, 2016.

Samsung, "E-mail discussion on eMBMS control plane details (66#19)", 3GPP TSG RAN WG2 #66b meeting, R2-093831, Jun. 29-Jul. 3, 2009, Los Angeles, USA.

Samsung, "Baseline CR capturing MBMS agreements affecting 36.331", 3GPP TSG-RAN WG2#66bis meeting, R2-094077, Jun. 28-Jul. 3, 2009, Los Angeles, USA.

Korean Patent Office, Notification of the Office Action (English Translation), Korean Patent Application No. 10-2011-7030048, dated Jul. 8, 2013.

Korean Patent Office, Notification of the Office Action (in Korean), Korean Patent Application No. 10-2011-7030048, dated Jul. 8, 2013.

* cited by examiner

METHOD, APPARATUS AND SYSTEM FOR CONFIGURING MULTIMEDIA BROADCAST MULTICAST SERVICE (MBMS) CONTROL INFORMATION

The present application claims the priority of the Chinese patent application with the application date of Aug. 11, 2009, the application number of 200910090799.7, and the patent name of "method, apparatus and system for configuring multimedia broadcast multicast service (MBMS) control information", all content of the priority application is combined into the present application by quoting.

FIELD OF THE PRESENT INVENTION

The present invention relates generally to the field of communication technology, and more particularly to method, apparatus and system for configuring multimedia broadcast multicast service (MBMS) control information.

BACKGROUND OF THE PRESENT INVENTION

In the LTE (Long Term Evolution) system, MBMS (Multimedia Broadcast Multicast Service) is used to provide multimedia broadcast and multicast services to users in wireless region; in the MBMS dedicated frequency-layer and the frequency-layer sharing with non-MBMS can provide MBMS. Thereinto, LTE cell supporting for MBMS can be MBMS dedicated cell, also can be a MBMS and unicast mixed cell; MBMS service can transmit in a single cell, and also can transmit in several cells; in addition, the transmission of MBMS in several cells need transmission mode which support MBSFN.

Specific, MBSFN (Multicast Broadcast Single Frequency Network) is defined to transmit simultaneously in more than one cell in the same time and with the same frequency; through the use of MBSFN transmission, can save frequency resource, improve utilization rate of frequency spectrum. Thereinto, MBSFN require multiple cell to send the same content at the same time, then, UE (User Equipment) will look several MBSFN cells as a big cell; Thereby, UE will not be interfered by transmission from neighboring cells, and can superimpose signals from several MBSFN cells, enhance the receiving reliability, improve the coverage rate. Further, UE can resolve multipath propagation time difference problem by using the MBSFN, eliminate the interference within the cell; and to solve coverage blind problem and others by the effect of diversity by the multi-cell transmission within the same frequency.

In the MBMS technology, logical channel associated with the MBMS transmission mainly including BCCH (Broadcast Control Channel), MCCH (Multicast Control Channel) and MTCH (Multicast Traffic Channel), thereinto, the BCCH used in the network side apparatus broadcast system information to the UE; So that the UE can find the resource location of MCCH according to the system information; The MCCH is a downlink channel that is one point-to-multipoint, used to transmit control information related to MBMS in the MBSFN region to the UE by the network side apparatus, a MCCH can correspond to one or more MTCH (i.e., MCCH can carry multiple MTCH control information); the MTCH is a downlink channel that is one point-to-multipoint, used to transmit MBMS service data to the UE by the network side apparatus.

Can be seen, for the multi-cell transmission of MBMS, need to transmit two types of control information in air interfaces, respectively, information broadcasting in BCCH channel, and information transmitting in MCCH channel. In existing technology, uniting the messages broadcasting in BCCH channel and the information transmitted in MCCH channel in a same signaling, concentrated organizing and united sending to each base station by MCE (Multicast Coordination Entity), and sending to the terminal by the base station, thereby ensure MCCH synchronous sending in the MBSFN region.

In process to achieve the present invention, the inventor find that there are at least the following problems in the existing technology:

With the changing of service, multi-cell transmission mode of MBMS in updating; for above-mentioned messages broadcasted in BCCH channel and the information transmitted in MCCH channel, the requirements of air interfaces will be different, then, if use the uniform configuration method, cannot meet the performance requirements of different air interfaces; and because of the change of MBMS service is frequenter than MCCH resource configuration, use the uniform configuration method bringing unnecessary signaling overhead.

SUMMARY OF THE PRESENT INVENTION

The present invention provides a method, an apparatus and a system for configuring Multimedia Broadcast Multicast Service (MBMS) control information, to save the signaling overhead.

To achieve the above-mentioned objective, the present invention provides a method for configuring MBMS control information, including:

The network side apparatus broadcasting MCCH configuration information to the terminal by BCCH, said terminal receiving said MCCH configuration information;

Said network side apparatus sending MBSFN region configuration information to said terminal by the MCCH; said MBSFN region configuration information is received by said terminal according to said MCCH configuration information;

The network side apparatus sending MBMS service data to the terminal by MTCH; said MBMS service data is received by said terminal according to said MBSFN region configuration information.

On the other hand, the present invention provides a method for configuring MBMS control information, including:

The terminal receiving the MCCH configuration information that is broadcasted from the network side apparatus by BCCH;

Said terminal receiving the MBSFN region configuration information that is sent by said network side apparatus by the MCCH according to said MCCH configuration information;

Said terminal receiving MBMS service date that is sent by said network side apparatus by MTCH according to said MBSFN region configuration information.

On the other hand, the present invention provides a network side apparatus, including:

Broadcasting module, for broadcasting MCCH configuration information to the terminal by BCCH, said terminal receiving said MCCH configuration information;

First sending module, for sending MBSFN region configuration information to the terminal by MCCH; said terminal receiving said MBSFN region configuration information according to said MCCH configuration information;

Second sending module, for sending MBMS service data to the terminal by MTCH; said terminal receiving said MBMS service data according to said MBSFN region configuration information.

On the other hand, the present invention provides a system for configuring MBMS control information, including:

Network side apparatus, for broadcasting MCCH configuration information to the terminal by the BCCH channel, sending MBSFN region configuration information to the terminal by MCCH, and sending MBMS service data to the terminal by MTCH;

Terminal, for receiving said MCCH configuration information, receiving said MBSFN region configuration information according to said MCCH configuration information, and receiving said MBMS service data according to said MBSFN region configuration information.

Compared with existing technologies, the present invention has the following advantages at least: the network side apparatus broadcasting MCCH configuration information to the terminal by BCCH, and sending MBSFN region configuration information to the terminal by MCCH respectively; thereby the information required to be transmitted in the BCCH channel and MCCH channel is configured in division, the capability requirements of the different air interfaces are satisfied, and the signaling overhead is saved.

BRIEF DESCRIPTION OF THE DRAWINGS

In order to explain the technical program of the present invention more clearly, the following will describe the figures used in the embodiment, obviously, the figure in the following description is only some embodiments of this invention, for the technical personnel in this field, they can also get other figures according to these figures, on the premise of not paying creative labor.

DETAILED DESCRIPTION OF THE EMBODIMENTS OF THE PRESENT INVENTION

With figures of the present invention, the following will describe the technology program of this invention clear and complete, obviously, the described embodiment is only part of the present invention embodiment, but not all the embodiment. Based on embodiment of the present invention, all the other embodiment got by the technical personnel in this field on the premise of not paying creative labor, are in the scope of the protection of the present invention.

In embodiment of the present invention, the information related with MBMS of LTE system can be transmitted in the BCCH and MCCH respectively, for the problem of the network side apparatus sending MBMS corresponding information (i.e. MCCH configuration information) by BCCH and MBMS corresponding information by MCCH (i.e. MBSFN region configuration information) to the terminal together. In embodiment of the present invention, the network side apparatus will transmit MCCH configuration information by BCCH and MBSFN region configuration information by MCCH to the terminal respectively, thereby the information required to be transmitted in the BCCH channel and MCCH is configured in division, the capability requirements of the different air interfaces are satisfied.

Figure 1:
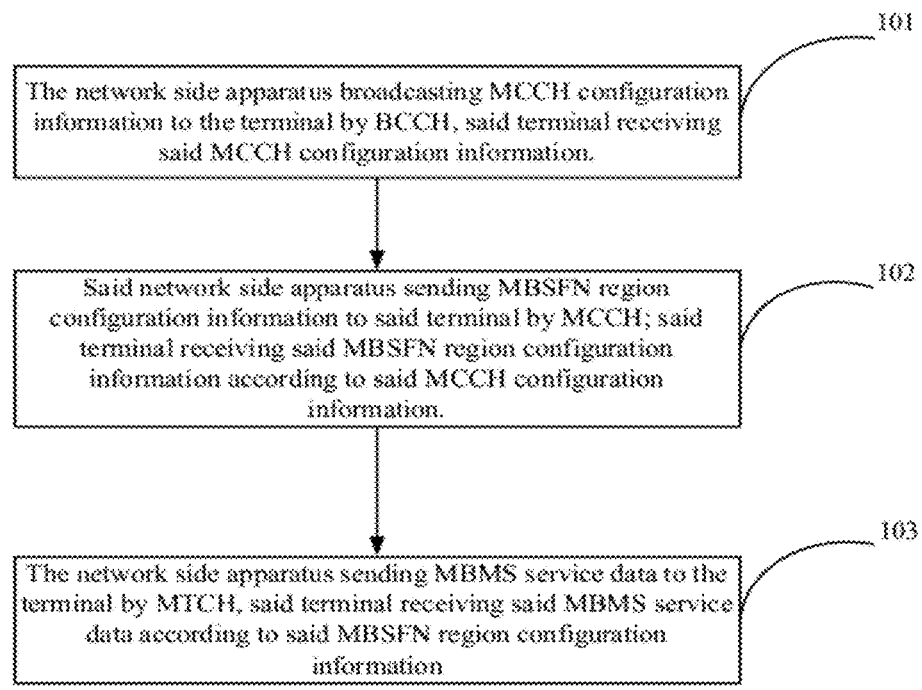
FIG. 1 is a process diagram of the method for configuring MBMS control information provided in embodiment 1 of the present invention.

Embodiment of the present invention provides a method for configuring MBMS control information, as shown in FIG. 1, including the following steps:

Step 101, the network side apparatus broadcasting MCCH configuration information to the terminal by BCCH, said terminal receiving said MCCH configuration information.

Thereinto, before said network side apparatus broadcasting MCCH configuration information to the terminal by BCCH, further including: said network side apparatus carrying MCCH configuration information of all MBSFN region in a MCCH configuration message; or, said network side apparatus carrying MCCH configuration information of a MBSFN region in a MCCH configuration message.

Specific, said network side apparatus including MCE entity and eNB, said network side apparatus broadcasting MCCH configuration information to the terminal by BCCH, specific including: said MCE entity getting MCCH configuration information in MBSFN region, and sending said MCCH configuration information to eNB; said eNB sending said MCCH configuration information to all terminal in MBSFN region.

Further, said network side apparatus including OM entity and eNB, said network side apparatus broadcasting MCCH configuration information to the terminal by BCCH, including: said OM entity getting MCCH configuration information in MBSFN region, and sending said MCCH configuration information to eNB; said eNB sending said MCCH configuration information to all terminal in MBSFN region.

Step 102, said network side apparatus sending MBSFN region configuration information to said terminal by MCCH; said terminal receiving said MBSFN region configuration information according to said MCCH configuration information.

Thereinto, before said network side apparatus sending MBSFN region configuration information to said terminal by MCCH, further including; said network side apparatus carrying MBSFN regions configuration information of all MBSFN regions in a MCCH configuration message; or, said network side apparatus carrying MBSFN region configuration information of a MBSFN region in a MCCH configuration message.

In embodiment of the present invention, said network side apparatus unified maintaining one configuration state machine for each MBSFN region, ensure all MBSFN region configuration information sending in same time; or said network side apparatus unified maintaining a configuration state machine for all MBSFN region, ensure all MBSFN region configuration information sending in same time.

Specific, said network side apparatus including MCE entity and eNB, wherein, said network side apparatus broadcasting MBSFN region configuration information to said terminal by MCCH, specific including: said MCE entity getting said MBSFN region configuration information according to the information of MBMS service, and sending said MBSFN region configuration information to said eNB; in the case of synchronous, said eNB sending said MBSFN region configuration information by MCCH.

Step 103, the network side apparatus sending MBMS service data to the terminal by MTCH, said terminal receiving said MBMS service data according to said MBSFN region configuration information.

In embodiment of the present invention, said MCCH configuration information including one or several of the following: MBSFN list; MBSFN synchronization region; MCCH repeat cycle; start sub-frame offset; occupied sub-frames; UM configuration of RLC; said MBSFN region configuration information including one or several of the following: PMCH or MCH configuration information; MBMS RB information; MBMS Session Start; MBMS Session Stop.

It needs to illustrate that said network side apparatus using MBSFN region as basic unit for managing MBMS resource.

Said network side apparatus uniting said MCCH configuration information and said MBSFN region configuration information into MBMS configuration information, and setting said MCCH configuration information and said MBSFN region configuration information are optional item; said network side apparatus setting said MBSFN region configuration information is empty, when need to broadcast MCCH configuration information to said terminal; said network side apparatus setting said MCCH configuration information is empty, when need to broadcast MBSFN region configuration information to said terminal.

Visible, through using method of the present invention embodiment provide, network side apparatus broadcasting MCCH configuration information to terminal by BCCH, and sending MBSFN region configuration information to terminal by MCCH; thereby the information required to be transmitted in the BCCH channel and MCCH channel is configured in division, the capability requirements of the different air interfaces are satisfied, and the signaling overhead is saved.

The embodiment 2 of the present invention provides a method for configuring MBMS control information, which is used in MBMS technology of the LTE system, the MBMS control information including the control information that broadcasted by BCCH and transmitted by MCCH, thereinto, the control information broadcasted by BCCH that carrying MCCH configuration information (examples in embodiment of the present invention take the MCCH configuration information as a example, of course, there are other control information, embodiment of the present invention don't repeat), the control information transmitted by MCCH carrying MBSFN region configuration information (examples in embodiment of the present invention take the MBSFN region configuration information as a example, of course, there are other control information, embodiment of the present invention don't repeat). In embodiment of the present invention, the MCCH configuration information including but not limit to MBSFN list, MBSFN synchronization region, MCCH repeat cycle, start sub-frame offset, occupied sub-frames, UM (Unacknowledged Mode) configuration of RLC (Radio Link Control), etc; UE can get the location of MCCH resources accurately by using the MCCH configuration information. The MBSFN region configuration information including but not limit to PMCH (Physics Multicast Channel) or MCH (Multicast Channel) configuration information, MBMS RB (Radio Bear) information (for example, RB provided in a MCCH modification cycle); MBMS Session Start; MBMS Session Stop, etc; thereinto, the MCH configuration information including but not limit to MSAP (Multi-Service Access Platform), MSAP occasion cycle.

Figure 2:
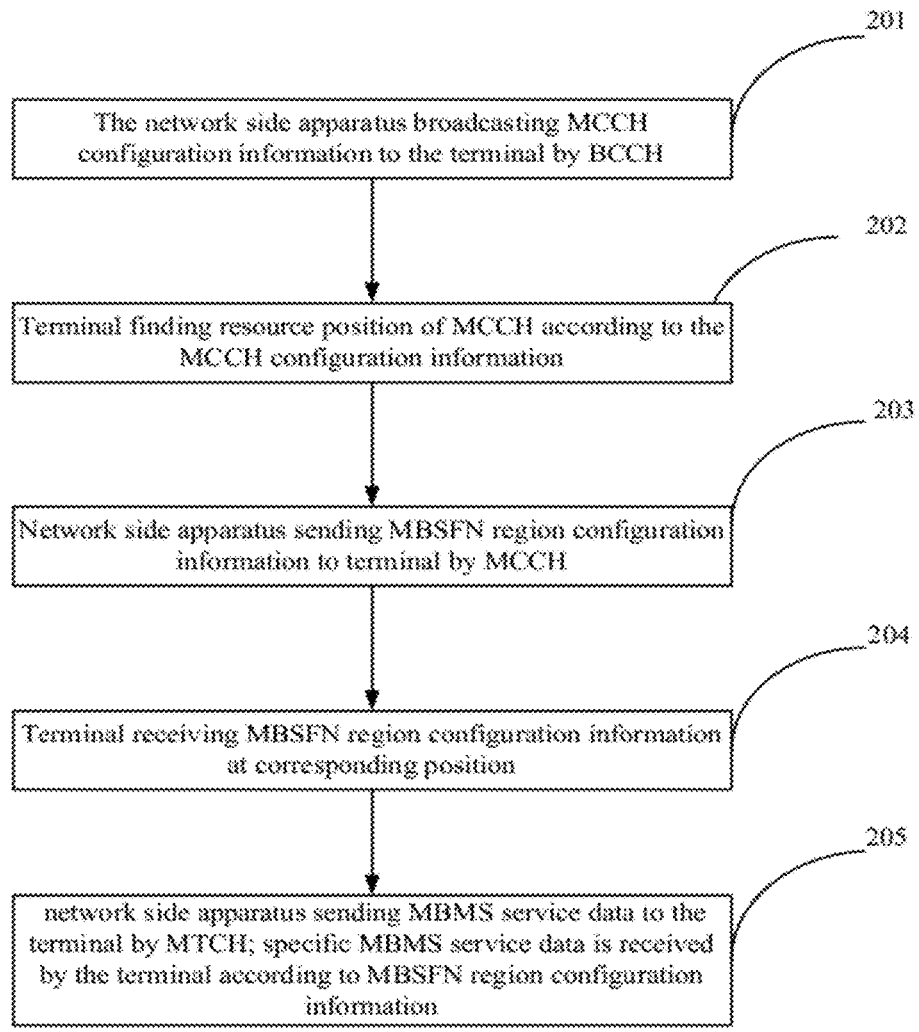
FIG. 2 is a process diagram of the method for configuring MBMS control information provided in embodiment 2 of the present invention.

As shown in FIG. 2, above-mentioned method of configuring MBMS control information including the following steps:

Step 201, the network side apparatus broadcasting MCCH configuration information to the terminal by BCCH. Thereinto, the network side apparatus including but not limit to RNC (Radio Network Controller), eNB (enhanced Node B), base station, MCE, etc, it needs to illustrate that the network side apparatus is not limit in above-mentioned apparatus, all apparatus on the network side are in the scope of embodiment of the present invention.

Figure 3:
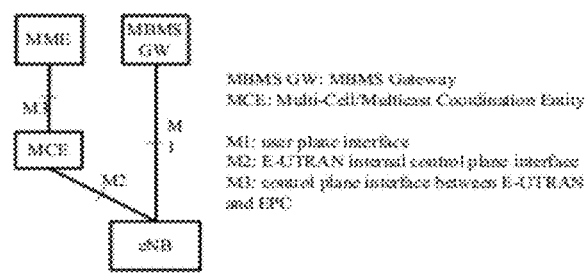
FIG. 3 is a LTE MBMS logical architecture diagram provided in embodiment of the present invention.

In embodiment of the present invention, take the LTE MBMS logical architecture shown in FIG. 3 as an example to explain, thereinto, the MCE, as the centralized node of RAN (Residential Access Network) side, when received the session start or stop message from MME (Mobile Management Entity), will organize and send the corresponding MCCH configuration information to each eNB in synchronous region, and eNB sending the MCCH configuration information to the corresponding terminal.

It needs to illustrate that for MBMS transmission of multi-region, need to send MCCH configuration information and MBSFN region configuration information on air interfaces; with the changing of service, the requirements that MCCH configuration information and MBSFN region configuration information on air interfaces are different, i.e. need to be treated differently when eNB getting MCCH configuration information and MBSFN region configuration information, in this step, eNB only send the MCCH configuration information to the appropriate terminal, thereby the different capability requirements are satisfied.

Figure 4:
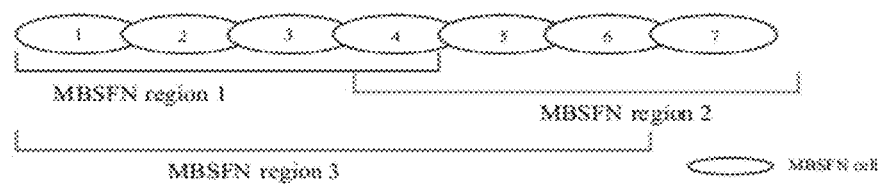
FIG. 4 is a Multi region MBSFN synchronous region diagram provided in embodiment of the present invention.

Specific, by using the MCCH configuration information, can achieve changes of cell in the MBSFN synchronization region, the allocation of MCCH physical resource of each MBSFN region, and other public configuration unrelated with service (for example, cell marking, etc.); as shown in FIG. 4, a MBSFN synchronization region composed of several cells, MBSFN region 1 including cell 1, cell 2, cell 3, cell 4; MBSFN region 2 including cell 4, cell 5, cell 6, cell 7; MBSFN region 3 including cell 1, cell 2, cell 3, cell 4, cell 5, cell 6, etc. Thereinto, in embodiment of the present invention, can put all MBSFN regions (for example, MBSFN region 1, MBSFN region 2 and MBSFN region 3) into one MCCH configuration information unit, as shown in List 1; and also can use one MCCH configuration information unit for each MBSFN region (for example, MBSFN region 1), as shown in List 2. Can be seen, effectively reduce the M2 interface signaling load when use one unit to integrate MCCH configuration information of all MBSFN regions; but when use one unit for every MBSFN region, eNB will manage each MBSFN region independently, without influence between each other, and more flexible. In the present invention, can choose from the above-mentioned two ways flexibly according to actual need.

| List 1 | |
|---|---|
| Information Type | Information Description |
| MBSFN Identity List | |
| >MBSFN Identity | Mark of MBSFN region |
| > Cell Information List | |
| >>cell mark | Marking a cell |
| >MCCH configuration information | |
| >>MCCH MSAP | Marking the sub-frame configuration of MCCH |
| >>MCCH cycle | Marking the repeat cycle and modification cycle of MCCH |
| >>L2 configuration | Marking mode configuration of RLC UM, etc. |

Thereinto, In embodiment of the present invention, MCE make the MBSFN region as basic logic unit of management, in List 1, the cell information list in MCCH configuration information indicate the cell which eNB of MBSFN region belongs to, in the cell which eNB belongs to, the MCCH contents will be transmitted synchronous. It can be seen, when the cell information changes, you can change the MBSFN synchronization region. Further, MCCH repeat cycle, start sub-frame offset, occupied sub-frames, UM (Unacknowledged Mode) configuration of RLC (Radio Link Control), etc. in MCCH configuration information, determine the basic physical configuration of control channel in the MBSFN region.

| List 2 | |
|---|---|
| Information Type | Information Description |
| MBSFN Identity | Mark of MBSFN region |
| Cell Information List | |
| >cell mark | Marking a cell |
| MCCH configuration information | |
| >MCCH MSAP | Mark the sub-frame configuration of MCCH |
| >MCCH cycle | Mark the repeat cycle and modification cycle of MCCH |
| >L2 configuration | Mark mode configuration of RLC UM, etc. |

Can be seen, List 2 compared with List 1, there is just no MBSFN Identity list, i.e. List 2 is just for one MBSFN region, the other case are the same as Table 1, embodiment of the present invention don't repeat.

It needs to illustrate that in embodiment of the present invention, the MCCH configuration information can configure in static mode according to actual need, or, eNB getting the MCCH configuration information from MCE, the getting process is achieved by M2 interface which is independent with MCCH message configuration.

Figure 5:
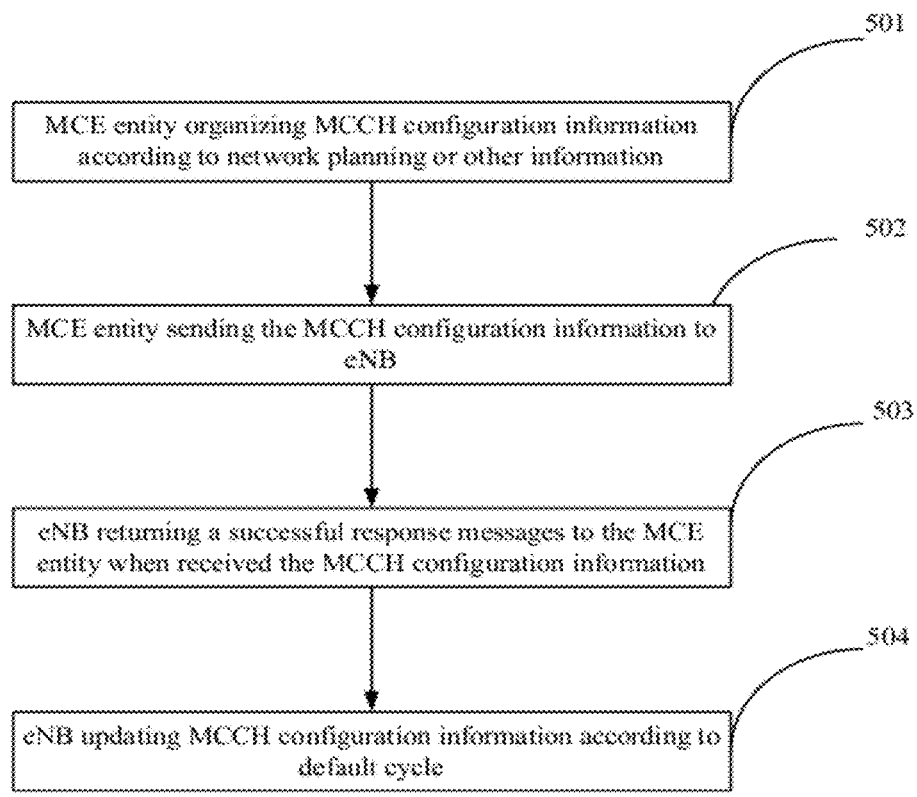
FIG. 5 is a process diagram of the network side apparatus broadcasting MCCH configuration information to the terminal by BCCH provided in embodiment of the present invention.

Further, as shown in FIG. 5, the network side apparatus broadcasting MCCH configuration information to the terminal by BCCH, specific including:

Step 501, MCE entity organizing MCCH configuration information according to network planning or other information, i.e. above-mentioned process of eNB getting the MCCH configuration information; thereinto, the MCCH configuration information include but not limit to: MBSFN list, MBSFN synchronization region, MCCH repeat cycle, start sub-frame offset, occupied sub-frames, UM mode configuration of RLC, etc.

Step 502, MCE entity sending the MCCH configuration information to eNB.

Step 503, eNB returning a successful response messages to the MCE entity, and sending this MCCH configuration information to all terminal in MBSFN region when received the MCCH configuration information. Thereinto, the eNB can organize the MCCH configuration information coming from MCE into a system message, and send the system message to all terminal in MBSFN region, no more tautology here.

Step 504, eNB updating MCCH configuration information according to default cycle. Thereinto, the eNB can update the MCCH configuration information at the border of modification cycle of system message (i.e. MCCH configuration information).

Specific, the modification cycle of MCCH configuration information is stored in the eNB, for example, set the modification cycle (i.e. the preset cycle) as 1 minute; so updated the MCCH configuration information every minute. Further, MCE entity will send will the MCCH configuration information to the eNB according to its strategy, the eNB can store the MCCH configuration information, at the preset cycle, eNB will use its stored MCCH configuration information to update MCCH configuration information; Of course, according to actual demand, eNB can also use MCCH configuration information coming from MCE to update MCCH configuration information immediately after receive it; this invention no longer relate. MCE entity will send will the MCCH configuration information to the eNB according to its strategy, include but not limited to: MCE entity sends MCCH configuration information periodically, or sends after the MCCH configuration information etc, embodiment of the present invention don't repeat.

Figure 6:
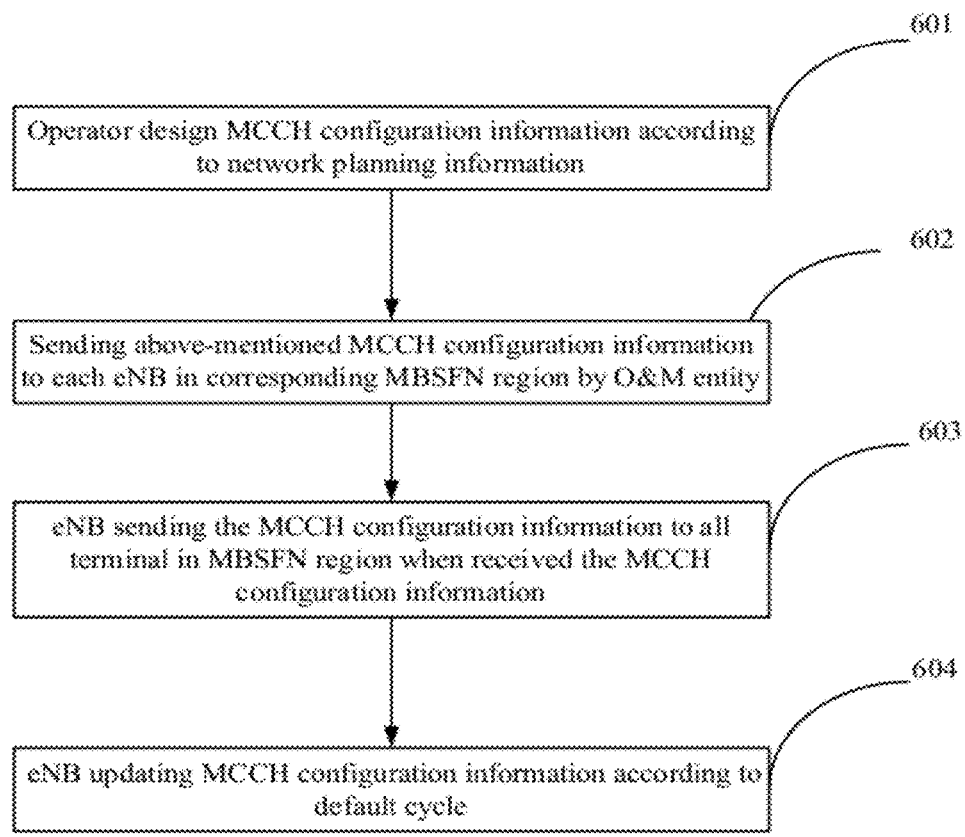
FIG. 6 is another process diagram of the network side apparatus broadcasting MCCH configuration information to the terminal by BCCH provided in embodiment of the present invention.

Further, as shown in FIG. 6, network side apparatus broadcasting MCCH configuration information to the terminal by BCCH.

Step 601, operator design MCCH configuration information according to network planning information etc, i.e. above-mentioned configuring the MCCH configuration information according to actual need. The information carrying content including but not limited to: MBSFN list; MBSFN synchronization region; MCCH repeat cycle; start sub-frame offset; occupied sub-frames; RLC UM mode configuration etc.

Step 602, sending above-mentioned MCCH configuration information to each eNB in corresponding MBSFN region by O&M (Operations & Maintenance) entity.

Step 603, eNB sending the MCCH configuration information to all terminal in MBSFN region when received the MCCH configuration information. Thereinto, system message composed of MCCH configuration information by the eNB, and sending the system message to all terminal in MBSFN region, no more tautology here.

Step 604, eNB updating MCCH configuration information according to default cycle. For example, setting default cycle is 1 minute; updating MCCH configuration information by each a minute. Further, O&M entity sending MCCH configuration information to eNB, the eNB can store the MCCH configuration information, eNB updating MCCH configuration information that stored in its own when default cycle end; of course, according to actual need, eNB also can updating MCCH configuration information by said MCCH configuration information from MCE when received MCCH configuration information from MCE; the present invention embodiment don't repeat.

Step 202, terminal finding resource position of MCCH according to the MCCH configuration information. Thereinto, the MCCH configuration information carrying MBSFN list; MBSFN synchronization region; MCCH repeat cycle; start sub-frame offset; occupied sub-frames; RLC non-recognition mode configuration, can found corresponding MCCH resource when terminal got above-mentioned MCCH configuration information.

Step 203, network side apparatus sending MBSFN region configuration information to terminal by MCCH.

It needs to illustrate that for transmitted MBSFN region configuration information in MCCH, need to constantly update with the service changes, may need to change configuration of MTCH service channel etc, and notice begin and end of service etc. Thereinto, in the present invention embodiment, continue to MBSFN synchronize region of shown in FIG. 4 as an example, can use to carry multiple MBSFN region configuration information (or all) in a configuration message, i.e. all MBSFN region integrated into a cell of MBSFN region configuration information, shown in FIG. 3, also can for use multiple configuration message, but each message carrying a MBSFN region configuration information only, i.e. for each MBSFN region, use a cell of MBSFN region configuration information, shown in FIG. 4. Can be seen, effective reducing the signaling load of M2 interface when use carry multiple MBSFN region configuration information in a configuration message; eNB independent managing each MBSFN region when use multiple configuration message, each other is not affected, more flexible; if a MBSFN region configuration is failure, it not affect configuration case of other MBSFN region, especially when a cell belong multiple MBSFN region, each MCCH sending cycle of MBSFN region may be different, this improve the transmission efficiency of M2 interface.

| List 3 | |
| --- | --- |
| Information Type | Information Description |
| MBSFN Identity List | |
| >MBSFN Identity | Mark of MBSFN region |
| >MCCH information | Or exist is RRC ASN encoded byte stream form |
| >>PMCH list | |
| >>>MSAP | Marking sub-frame configuration of PMCH channel |
| >>>MCS (modulation and coding style) | Marking modulation coding mode |
| >>>MSAP opportunity cycle | Marking cycle of PMCH configuration |
| >>>MBMS service list | |
| >>>> MBMS service mark | |
| >>>>MTCH configuration | Marking logic channel configuration etc |
| >>>> Transport layer address information | Marking user side receives address of MBMS conversation |
| > Time information | Marking dispatch time of MCCH |
| > Configuration mark | Marking a new configuration |

Thereinto, in the present invention embodiment, MCE still use MBSFN region as management basic logical unit, in List 3, indicating the main content of composing MCCH message in MBSFN region by contained MCCH information, indicating the resource configuration of all PMCH physical channel and mapping relationship with MBMS service in MBSFN region by contained PMCH information list, each PMCH including MSAP, MCS, MSAP occation cycle parameter etc, each PMCH configuring MBMS service list that has been activated, each MBMS service consist of service mark and logical channel configuration, transport layer address information parameter etc. For MCCH message configuration of each MBSFN region, need to demonstrate time point of dispatch, and need to maintain a configuration mark, thereby ensure reliability of MCCH message simultaneously sending, i.e. existing a configuration state machine for each MBSFN; of course, eNB also can unified maintaining a configuration state machine for all MBSFN region according to actual need, thereby simplify process. Thereinto, above-mentioned information marking cell configuration case of MCCH that terminated at the eNB, if MCCH terminated at the MCE, then MCCH information of above-mentioned list constituted by RRC ASN encoded byte stream, don't contain the following cell detail, the present invention embodiment don't repeat.

| List 4 | |
| --- | --- |
| Information Type | Information Description |
| MBSFN Identity | Mark of MBSFN region |
| MCCH information | Or exist is RRC ASN encoded byte stream form |
| >PMCH List | |
| >>MSAP | Marking sub-frame configuration of PMCH channel |
| >>MCS | Marking modulation coding mode |
| >>MSAP opportunity cycle | Marking cycle of PMCH configuration |
| >>MBMS service list | |
| >>>MBMS service mark | |
| >>>MTCH configuration | Marking logic channel configuration etc |
| >>> Transport layer address information | Marking user side receives address of MBMS conversation |
| Time information | Marking dispatch time of MCCH |
| Configuration mark | Marking a new configuration |

Can be seen, compare List 4 and List 3, there is not option MBSFN Identity list only, List 4 aiming a MBSFN region only, other case is similar to case of List 3, the present invention embodiment don't repeat.

Figure 7:
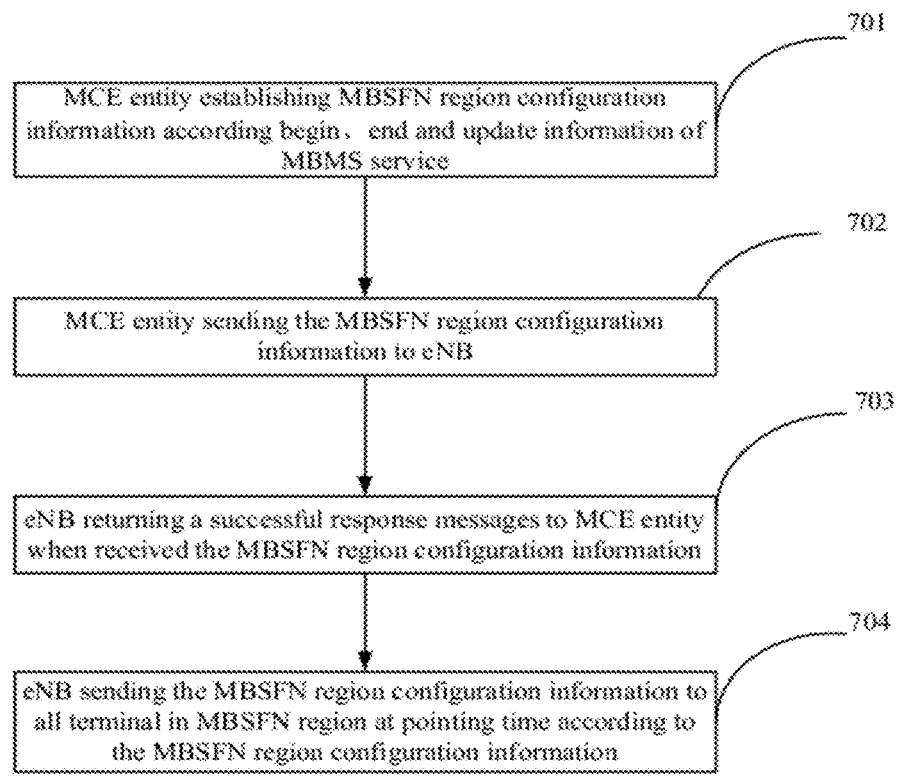
FIG. 7 is a process diagram of the network side apparatus sending MBSFN region configuration information to the terminal by the MCCH 1 provided in embodiment of the present invention.

Further, as shown in FIG. 7, network side apparatus sending MBSFN region configuration information to terminal by MCCH, specific including:

Step 701, MCE entity establishing MBSFN region configuration information according begin, end and update information of MBMS service; thereinto, the MBSFN region configuration information carrying content but not limited to: MBSFN mark, configuration information of PMCH (or MCH) (i.e., MSAP, MCS, MSAP occasion cycle), MBMS RB information (i.e., provided RB in a revision cycle MCCH), MBMS Session Start, MBMS Session Stop and synchronization time point etc.

Step 702, MCE entity sending the MBSFN region configuration information to eNB.

Step 703, eNB returning a successful response messages to MCE entity when received the MBSFN region configuration information.

Step 704, eNB sending the MBSFN region configuration information to all terminal in MBSFN region at pointing time (determined by MCCH configuration information) according to the MBSFN region configuration information when ensure state is synchronization.

Step 204, terminal receiving MBSFN region configuration information at corresponding position. Thereinto, because of MBSFN region configuration information is sent by MCCH, so terminal finding resource position according to above-mentioned MCCH configuration information, thereby getting MBSFN region configuration information.

Step 205, network side apparatus sending MBMS service data to the terminal by MTCH; specific MBMS service data is received by the terminal according to MBSFN region configuration information.

Thereinto, can adjust steps of The present invention embodiment according to actual need.

Visible, through using method of the present invention embodiment provide, network side apparatus broadcasting MCCH configuration information to terminal by BCCH, and sending MBSFN region configuration information to terminal by MCCH; thereby the information required to be transmitted in the BCCH channel and MCCH channel is configured in division, the capability requirements of the different air interfaces are satisfied, and the signaling overhead is saved.

The present invention embodiment 3 provide a method of configuration MBMS control information, the method uniting MCCH configuration information and MBSFN region configuration information into a message, achieving MCCH configuration information and MBSFN region configuration information separately sending by setting options, shown in List 5, corresponding message of MCCH configuration information and MBSFN region configuration information;

List 5

| Information Type | Information Description |
| --- | --- |
| MBSFN Identity | Mark of MBSFN region |
| Cell Information List | optional presence |
| >cell mark | Marking a cell |
| MCCH configuration information | optional presence |
| >omission (details have been described in the above-mentioned list, here don't repeat) | |
| MCCH Information(MBSFN region configuration information) | optional presence |
| >omission (details have been described in the above-mentioned list, here don't repeat) | |
| Time information | Marking dispatch time of MCCH |
| Configuration mark | Marking a new configuration |

Can be seen from list 5, in practical applications, because of MCCH configuration information and MBSFN region configuration information are optional item, so can select MCCH configuration information, but can't select MBSFN region configuration information; then, can be above-mentioned list 2 (or list 1); also can MBSFN region configuration information, but can't select MCCH configuration information, then, can be above-mentioned list 3 (or list 4). The present invention embodiment don't repeat the case that when both are not selected; the present invention embodiment don't repeat the case that when both are selected, the case is same with the existing technology.

Figure 8:
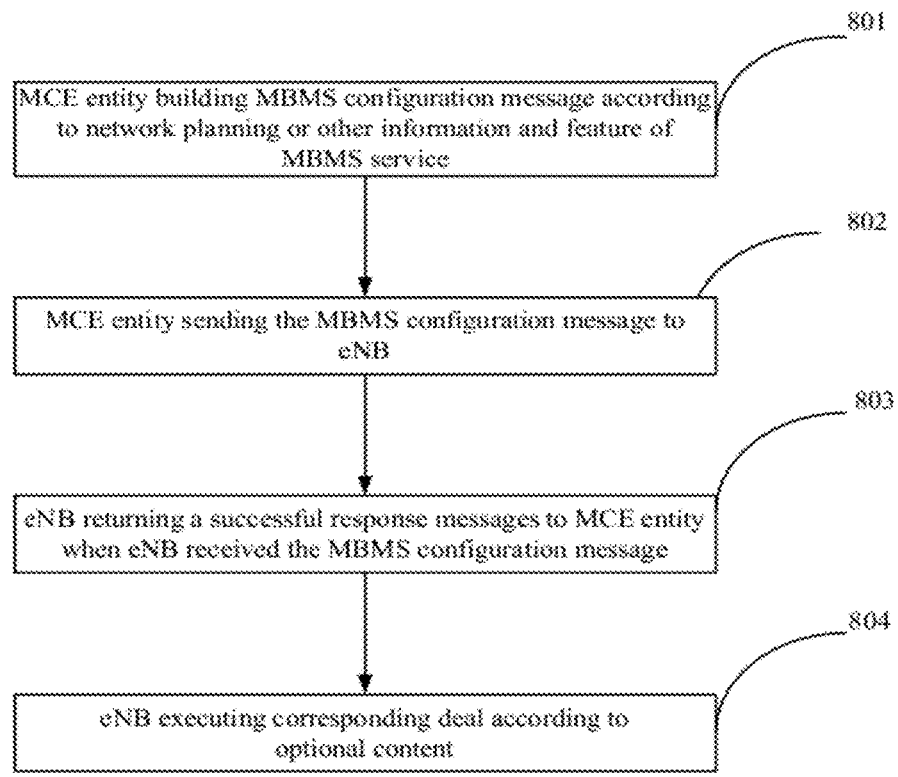
FIG. 8 is a process diagram of the method for configuring MBMS control information provided in embodiment 3 of the present invention.

Shown in FIG. 8, above-mentioned method of configuration MBMS control information including the following steps:

Step 801, MCE entity building MBMS configuration message according to network planning or other information and feature of MBMS service, the MBMS configuration message is content of above-mentioned list 5, including MCCH configuration information and MBSFN region configuration information, MCE entity adding MCCH configuration information or MBSFN region configuration information in list 5 according actual need; for other case, the present invention embodiment don't repeat. For example, adding corresponding information into MCCH configuration information corresponding list when need sending MCCH configuration information to eNB; setting MBSFN region configuration information is empty; similarly, adding corresponding information into MBSFN region configuration information corresponding list when need sending MBSFN region configuration information to eNB; setting MCCH configuration information is empty.

Step 802, MCE entity sending the MBMS configuration message to eNB.

Step 803, eNB returning a successful response messages to MCE entity when eNB received the MBMS configuration message.

Step 804, eNB executing corresponding deal according to optional content. For example, updating MCCH configuration information according to default cycle when MBMS configuration message containing MCCH configuration information; eNB sending the MBSFN region configuration information to all terminal in MBSFN region at pointing time and MCCH physical resource according to the MBSFN region configuration information when MBMS configuration message containing MBSFN region configuration information.

Thereinto, can adjust steps of The present invention embodiment according to actual need. Visible, through using method of the present invention embodiment provide, network side apparatus broadcasting MCCH configuration information to terminal by BCCH, and sending MBSFN region configuration information to terminal by MCCH; thereby the information required to be transmitted in the BCCH channel and MCCH channel is configured in division, the capability requirements of the different air interfaces are satisfied, and the signaling overhead is saved.

Figure 9:
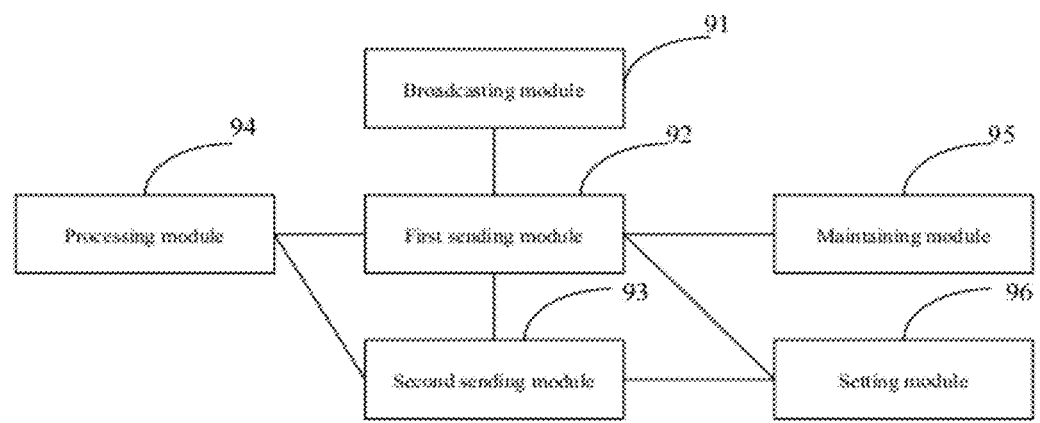
FIG. 9 is a structure diagram of network side apparatus provided in embodiment 4 of the present invention.

The present invention embodiment 4 provide a network side apparatus, shown in FIG. 9, including:

Broadcasting module 91, for broadcasting MCCH configuration information to terminal by BCCH, said terminal receiving said MCCH configuration information;

First sending module 92, for sending MBSFN region configuration information to terminal by MCCH; said terminal receiving said MBSFN region configuration information according to said MCCH configuration information;

Thereinto, when said network side apparatus is MCE entity or OM entity, said first sending module 92 specific for: getting MCCH configuration information in MBSFN region, and sending said MCCH configuration information to said eNB; said eNB sending said MCCH configuration information to all terminal of MBSFN.

Second sending module 93, for sending MBMS service data to terminal by MTCH; said terminal receiving said MBMS service data according to said MBSFN region configuration information.

Thereinto, When network side apparatus are MCE entity, said second sending module 93, specifically for getting MBSFN region configuration information according to MBMS service information; and sending said MBSFN region configuration information to said eNB; said eNB sending said MBSFN region configuration information in MCCH when ensure state is synchronous.

Processing module 94, for carrying MCCH configuration information of all MBSFN region in a MCCH configuration message; or, carrying MCCH configuration information of a MBSFN region in a MCCH configuration message.

Further, said processing module 94 also for: carrying MBSFN region configuration information of all MBSFN region in a MCCH configuration message; or, carrying MBSFN region configuration information of a MBSFN region in a MCCH configuration message.

Maintaining module 95, for maintaining a configuration state machine for each MBSFN region, ensure all MBSFN region configuration information sending in same time; or maintaining a configuration state machine for all MBSFN region, ensure all MBSFN region configuration information sending in same time.

Setting module 96, for uniting said MCCH configuration information and said MBSFN region configuration information into MBMS configuration information, and setting said MCCH configuration information and said MBSFN region configuration information are optional item; said network side apparatus setting said MBSFN region configuration information is empty, when need to broadcast MCCH configuration information to said terminal; said network side apparatus setting said MCCH configuration information is empty, when need to broadcast MBSFN region configuration information to said terminal;

It needs to illustrate that in the present invention embodiments, said MCCH configuration information including the following in one or several: MBSFN list; MBSFN synchronization region; MCCH repeat cycle; start sub-frame offset; occupied sub-frames; RLC non-recognition mode configuration; said MBSFN region configuration information including the following in one or several: PMCH or MCH configuration information; MBMS RB information; MBMS Session Start; MBMS Session Stop.

Using MBSFN region as basic unit for managing MBMS resource in the present invention embodiments.

Thereinto, each module of device of the present invention embodiments can integrate in one, also can separate deployment. Above-mentioned module of embodiment can unite into a module, also can further split into several sub-modules.

The present invention embodiments also provides a system of configuration MBMS control information, including:

Network side apparatus, for broadcasting MCCH configuration information to the terminal by BCCH, sending MBSFN region configuration information to said terminal by MCCH, sending MBMS service data to said terminal by MTCH;

Terminal, for receiving said MCCH configuration information, receiving said MBSFN region configuration information according to said MCCH configuration information, and receiving said MBMS service data according to said MBSFN region configuration information.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer device (such as mobile phone, personal computers, servers, or network equipments, etc.) implement the methods described in the embodiments of the present invention.

The technical personnel in this field can understand drawing is a schematic of preferred embodiment, the module or process of drawing is not necessarily for implementing the present invention.

The technical personnel in this field can understand the modules of the devices in the embodiments can be set in the devices according to the description of the embodiments, also can be set in one or more devices different from the embodiments. Modules in the above-mentioned embodiments can be integrated in one entirety, also can be deployed separately, can be combined into one module, also can be further split into multiple sub-modules.

Serial numbers of the above-mentioned embodiments of the present invention are only used for description, it does not express whether the embodiment is excellent or poor. The public content is only some specific embodiments of the present invention. However, the invention is not limited by these, whatever modifications can be imagined by the technical personnel in this field all should be in the protective range of the present invention.

The invention claimed is:

1. A method of configuring multimedia broadcast multimedia service (MBMS) control information, comprising:
broadcasting, by a network side apparatus, multicast control channel (MCCH) configuration information in an MCCH configuration message to terminals via a broadcast control channel (BCCH), wherein the MCCH configuration information is received by said terminals;
sending, by said network side apparatus, multicast broadcast single frequency network (MBSFN) region configuration information to said terminals via an MCCH; wherein said MBSFN region configuration information is received by said terminals according to said MCCH configuration information;
sending, by said network side apparatus, MBMS service data to said terminals via a multicast traffic channel (MTCH); wherein said MBMS service data is received by said terminals according to said MBSFN region configuration information;
wherein, before the step of broadcasting, by said network side apparatus, said MCCH configuration information to said terminals via said BCCH, the method further comprises:
carrying, by said network side apparatus, pieces of MCCH configuration information for all MBSFN regions in one MCCH configuration message via BCCH, wherein each piece of the pieces of MCCH configuration information comprises an identity list of all MBSFN regions, an identity of a MBSFN region in the identity list of the all MBSFN regions, an information list of cells in the MBSFN region, and a cell mark in the information list of cells for marking one of the cells; or,
carrying, by said network side apparatus, MCCH configuration information for each MBSFN region of all MBSFN regions in a MCCH configuration message corresponding to the each MBSFN region via BCCH, wherein the MCCH configuration information comprises an identity of a MBSFN region, an information list of cells in the MBSFN region, and a cell mark in the information list of cells for marking one of the cells.

2. The method as claimed in claim 1, wherein said network side apparatus comprises a multicast coordination entity (MCE) and an enhanced Node B (eNB), and the step of broadcasting, by said network side apparatus, said MCCH configuration information to said terminals via said BCCH comprises:
getting MCCH configuration information for an MBSFN region by said MCE, and sending said MCCH configuration information to said eNB by said MCE;
returning a successful response message to the MCE by the eNB; and
sending said MCCH configuration information to all terminals in said MBSFN region by said eNB.

3. The method as claimed in claim 1, wherein said network side apparatus comprises an operations and maintenance (OM) entity and an eNB, and the step of broadcasting, by said network side apparatus, said MCCH configuration information to said terminals via said BCCH, including:
  getting MCCH configuration information for an MBSFN region by said OM entity, and sending said MCCH configuration information to said eNB by said OM entity;
  sending said MCCH configuration information to all terminals in said MBSFN region by said eNB.

4. The method as claimed in claim 1, wherein before the step of sending, by said network side apparatus, said MBSFN region configuration information to said terminals via said MCCH, the method further comprises:
  carrying, by said network side apparatus, pieces of MBSFN region configuration information for all MBSFN regions in one MBSFN region configuration message; or,
  carrying, by said network side apparatus, MBSFN region configuration information for one MBSFN region in one MBSFN region configuration message.

5. The method as claimed in claim 4, further comprising:
  independently maintaining one configuration state machine for each MBSFN region by said network side apparatus, to ensure said MBSFN region configuration information is sent simultaneously; or
  maintaining an identical configuration state machine for all MBSFN regions by said network side apparatus, to ensure all pieces of MBSFN region configuration information are sent simultaneously.

6. The method as claimed in claim 1, wherein said network side apparatus comprises an MCE and an eNB, and the step of sending, by said network side apparatus, said MBSFN region configuration information to said terminals by said MCCH, including:
  getting, by said MCE, said MBSFN region configuration information according to information of an MBMS service; and sending said MBSFN region configuration information to said eNB by said MCE;
  returning a successful response message to the MCE by the eNB; and
  sending said MBSFN region configuration information via said MCCH by said eNB, in the case that synchronization is ensured.

7. The method as claimed in claim 1, wherein, said MCCH configuration information comprises one or any combination of: an MBSFN list; an MBSFN synchronization region; an MCCH repeat cycle; a start sub-frame offset; a quantity of occupied sub-frames; and a radio link control (RLC) non-recognition mode configuration; and
  said MBSFN region configuration information comprises one or any combination of: physical multicast channel (PMCH) configuration information or multicast channel (MCH) configuration information; an MBMS radio bear (RB) information; MBMS Session Start; MBMS Session Stop.

8. The method as claimed in claim 1, further comprising:
  taking MBSFN region as basic unit for managing MBMS resources, by said network side apparatus.

9. The method as claimed in claim 1, further comprising:
  uniting said MCCH configuration information and said MBSFN region configuration information into an MBMS configuration message by said network side apparatus, and setting said MCCH configuration information and said MBSFN region configuration information as optional items;
  setting said MBSFN region configuration information as empty by said network side apparatus, when said MCCH configuration information needs to be broadcast to said terminals;
  setting said MCCH configuration information as empty by said network side apparatus, when said MBSFN region configuration information needs to be sent to said terminals.

10. A method of configuring multimedia broadcast multimedia service (MBMS) control information, comprising:
  receiving, by a terminal, multicast control channel (MCCH) configuration information in an MCCH configuration message broadcast by a network side apparatus via a broadcast control channel (BCCH);
  receiving, by said terminal according to said MCCH configuration information, multicast broadcast single frequency network (MBSFN) region configuration information sent by said network side apparatus via an MCCH;
  receiving, by said terminal according to said MBSFN region configuration information, MBMS service data sent by said network side apparatus via a multicast traffic channel (MTCH);
  wherein said network side apparatus carries pieces of MCCH configuration information for all MBSFN regions in one MCCH configuration message via BCCH, wherein each piece of the pieces of MCCH configuration information comprises an identity list of all MBSFN regions, an identity of a MBSFN region in the identity list of the all MBSFN regions, an information list of cells in the MBSFN region, and a cell mark in the information list of cells for marking one of the cells; or,
  said network side apparatus carries MCCH configuration information for each MBSFN region of all MBSFN regions in a MCCH configuration message corresponding to the each MBSFN region via BCCH, wherein the MCCH configuration information comprises an identity of a MBSFN region, an information list of cells in the MBSFN region, and a cell mark in the information list of cells for marking one of the cells.

11. A network side apparatus, comprising a computer processor and a computer-readable storage medium which stores a plurality of computer-executable instructions, wherein the computer-executable instructions, when being executed by the computer processor, cause the computer processor to:
  broadcast multicast control channel (MCCH) configuration information in an MCCH configuration message to terminals via a broadcast control channel (BCCH), said terminals receiving said MCCH configuration information;
  send multicast broadcast single frequency network (MBSFN) region configuration information to said terminals via an MCCH, said terminals receiving said MBSFN region configuration information according to said MCCH configuration information;
  send multimedia broadcast multimedia service (MBMS) service data to said terminals by a multicast traffic channel (MTCH), said terminals receiving said MBMS service data according to said MBSFN region configuration information;
  wherein the computer-executable instructions, when being executed by the computer processor, further cause the computer processor to:
  carry pieces of MCCH configuration information for all MBSFN regions in one MCCH configuration message via BCCH, wherein each piece of the pieces of MCCH configuration information comprises an identity list of all MBSFN regions, an identity of a MBSFN region in the identity list of the all MBSFN regions, an information list of cells in the MBSFN region, and a cell mark in the information list of cells for marking one of the cells; or, carry MCCH configuration information for each MBSFN region of all MBSFN regions in a MCCH configuration message corresponding to the each MBSFN region via BCCH, wherein the MCCH configuration information comprises an identity of a MBSFN region, an information list of cells in the MBSFN region, and a cell mark in the information list of cells for marking one of the cells.

12. The network side apparatus as claimed in claim 11, wherein the computer-executable instructions, when being executed by the computer processor, further cause the computer processor to:

carry pieces of MBSFN region configuration information for all MBSFN regions in one MBSFN region configuration message; or, carry MBSFN region configuration information for one MBSFN region in one MBSFN region configuration message.

13. The network side apparatus as claimed in claim 11, wherein, in the case that said network side apparatus comprises a multicast coordination entity (MCE), or an operations and maintenance (OM) entity, the computer-executable instructions, when being executed by the computer processor, cause the computer processor to: get MCCH configuration information for an MBSFN region, and send said MCCH configuration information to an enhanced Node B (eNB); said eNB sending said MCCH configuration information to all terminals in said MBSFN;

in the case that said network side apparatus comprises an MCE, the computer-executable instructions, when being executed by the computer processor, cause the computer processor to: get MBSFN region configuration information according to MBMS service information and send said MBSFN region configuration information to said eNB; wherein said eNB returns a successful response message to the MCE and sends said MBSFN region configuration information via said MCCH when synchronization is ensured.

14. The network side apparatus as claimed in claim 13, wherein the computer-executable instructions, when being executed by the computer processor, further cause the computer processor to:

maintain one configuration state machine for each MBSFN region, to ensure said MBSFN region configuration information is sent simultaneously; or maintain an identical configuration state machine for all MBSFN regions, to ensure all pieces of MBSFN region configuration information are sent simultaneously.

15. The network side apparatus as claimed in claim 11, wherein the computer-executable instructions, when being executed by the computer processor, further cause the computer processor to:

unite said MCCH configuration information and said MBSFN region configuration information into an MBMS configuration message, and set said MCCH configuration information and said MBSFN region configuration information as optional items; wherein said network side apparatus sets said MBSFN region configuration information as empty, when said MCCH configuration information to needs to be broadcast said terminals;

said network side apparatus sets said MCCH configuration information as empty, when said MBSFN region configuration information needs to be sent to said terminals.

16. A system of configuring multimedia broadcast multimedia service (MBMS) control information, comprising:

a network side apparatus comprising a computer processor and a computer-readable storage medium which stores a plurality of computer-executable instructions, wherein the computer-executable instructions, when being executed by the computer processor, cause the computer processor to broadcast multicast control channel (MCCH) configuration information in an MCCH configuration message to terminals via a broadcast control channel (BCCH), send multicast broadcast single frequency network (MBSFN) region configuration information to said terminals via an MCCH, and send MBMS service data to said terminals via a multicast traffic channel (MTCH), wherein the computer-executable instructions, when being executed by the computer processor, further cause the computer processor to: carry pieces of MCCH configuration information for all MBSFN regions in one MCCH configuration message via BCCH, wherein each piece of the pieces of MCCH configuration information comprises an identity list of all MBSFN regions, an identity of a MBSFN region in the identity list of the all MBSFN regions, an information list of cells in the MBSFN region, and a cell mark in the information list of cells for marking one of the cells; or, carry MCCH configuration information for each MBSFN region of all MBSFN regions in a MCCH configuration message corresponding to the each MBSFN region via BCCH, wherein the MCCH configuration information comprises an identity of a MBSFN region, an information list of cells in the MBSFN region, and a cell mark in the information list of cells for marking one of the cells; and said terminals, for receiving said MCCH configuration information, receiving said MBSFN region configuration information according to said MCCH configuration information, and receiving said MBMS service data according to said MBSFN region configuration information.

* * * * *